A. B. FIELD.
FIELD STRUCTURE FOR DYNAMO ELECTRIC MACHINES.
APPLICATION FILED JAN. 22, 1906.
912,551.
Patented Feb. 16, 1909.
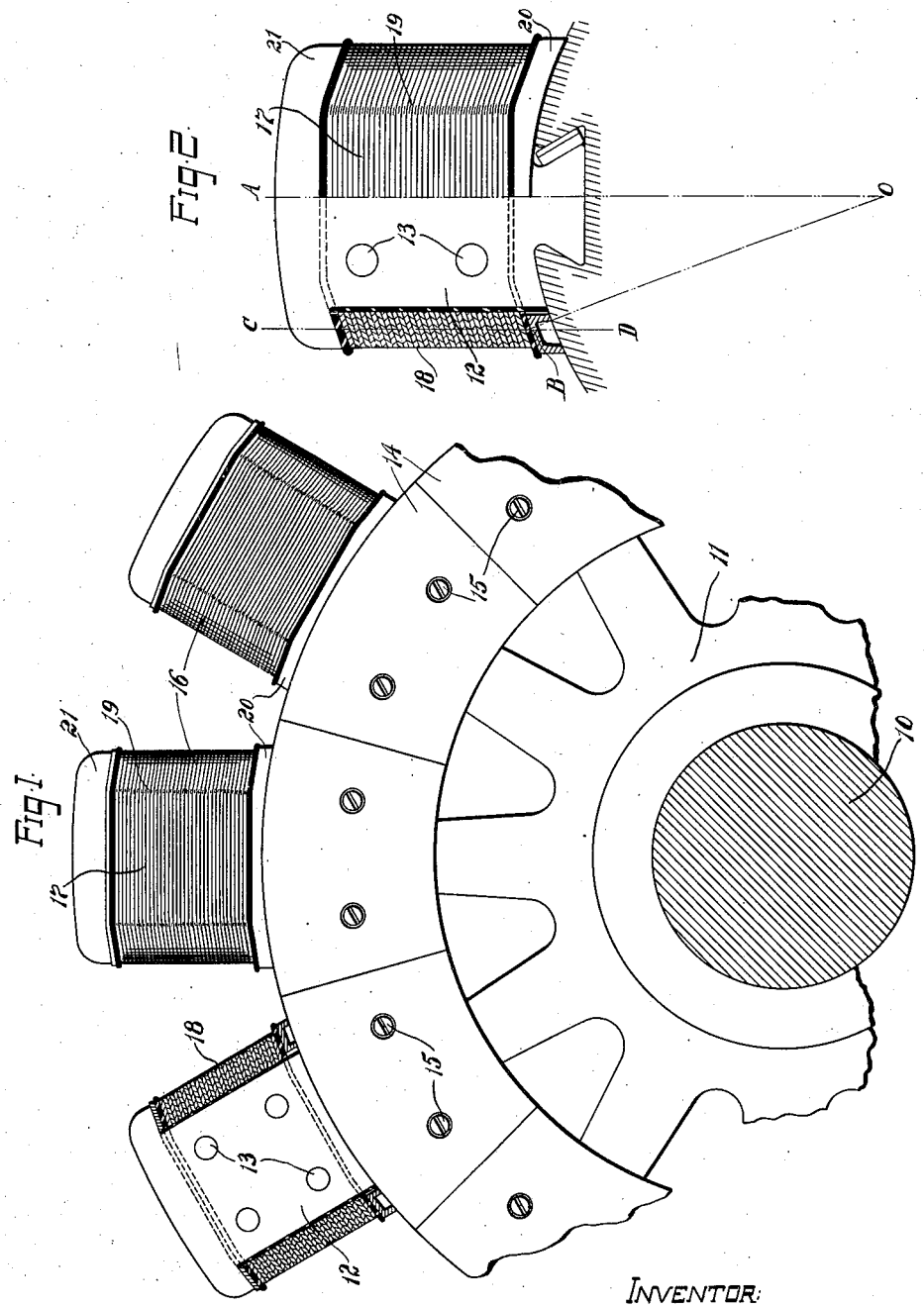
WITNESSES:
George J. Schwartz
Fred J. Kinsey
INVENTOR:
Allan B. Field.
By
Chas. E. Lord
ATTORNEY.

UNITED STATES PATENT OFFICE.

ALLAN B. FIELD, OF NORWOOD, OHIO, ASSIGNOR TO THE BULLOCK ELECTRIC MANU-
FACTURING COMPANY, A CORPORATION OF OHIO.

FIELD STRUCTURE FOR DYNAMO-ELECTRIC MACHINES.

No. 912,551.   Specification of Letters Patent.   Patented Feb. 16, 1909.

Application filed January 22, 1906. Serial No. 297,104.

*To all whom it may concern:*

Be it known that I, ALLAN B. FIELD, a subject of the King of England, residing at Norwood, in the county of Hamilton and State of Ohio, have invented certain new and useful Improvements in Field Structures for Dynamo-Electric Machines, of which the following is a full, clear, and exact specification.

My invention relates to dynamo-electric machines and particularly to the construction and arrangement of the field coils or windings on the rotatable elements of high speed alternators.

In the ordinary construction of rotating field element for alternating current generators, the coils are formed from strap copper edgewise wound, the individual layers at all parts of the coil being normal to the coil axis. When this construction is applied to rotating elements of high speed machines such as turbo-alternators, the coils or windings are subjected to such enormous centrifugal forces that they may be strained or distorted.

In a rotating field element, centrifugal force on any portion of a coil acts in the direction of a radius. This force acting radially may be divided into two components, one parallel to the axis of the pole and the other normal thereto. The component parallel to the axis of the pole is, in the usual construction, directed against the pole tip or pole shoe, and the normal component is balanced only by the strength and stiffness of the coil itself. Therefore the stresses between adjacent turns or layers consist of a normal pressure, and a shearing stress which tends to displace the turns. It is easily seen that certain portions of the coils are under practically no stress whatever and other portions, viz. the sides of the coils or the portions between adjacent poles are under considerable stress. It is also seen that the greater the width of the pole pieces, the greater will be the normal component and hence the shearing stress. Several methods have been proposed for avoiding this difficulty, as by bracing the sides of the coils on adjacent poles by means of wedges fastened to the core or poles. It has also been proposed to employ coils of edgewise wound strap copper, built wedge-shaped or with converging sides, and to support these coils on wedge-shaped pole pieces or in radial slots in a cylindrical core. In the latter case the center lines of the sides of the coils coincide with radii of the rotating field element and the centrifugal forces acting along these lines will be taken up by the pole tips or shoes, or by the retaining wedges in the slots, and there is no tendency for coils so constructed to become distorted. The above constructions are not suitable for all types of machines.

The object of my invention is to provide for high speed dynamo-electric machines coils which can be easily applied to the pole pieces and which are so constructed that there will be little or no danger of portions of the coils being displaced or distorted.

In carrying out my invention I provide the rotatable member with coils of edgewise wound strap copper or other conducting material, the portions of the layers of each coil which are subject to shearing stresses due to centrifugal force and tending to bulge the coils outward away from the pole being inclined to the pole axis at an angle such that said shearing stresses are reduced to a minimum.

In machines of ordinary construction the shearing stresses tending to bulge the coils outward or to cause the layers to be shifted away from the pole can be made negligible or reduced to a minimum by bending the sides of the coils at an angle such that the side portions of the innermost layers are at right angles to radii extending from the axis of the rotatable member to said innermost layers.

My invention may be further briefly summarized as consisting in the construction and combination of parts hereinafter set forth in the following description, drawings and claims.

For a better understanding of my invention, reference is had to the accompanying drawings, in which—

Figure 1 is an elevation of a portion of a rotatable field element of a dynamo-electric machine, parts being shown in section; and Fig. 2 is a sectional elevation of one of the pole pieces and a coil thereon, the pole being dove-tailed to a support, the parts being exaggerated to more clearly illustrate my invention.

Referring to the figures of the drawing, I have shown at 10 a shaft of the machine on which is mounted the usual spider 11. Attached to the outer rim of this spider are a plurality of laminated pole pieces 12 having parallel opposite sides which pole pieces may be fastened to the rim by the usual dovetailed construction or by any other desired means. The laminæ are preferably held together by rivets 13. Segmental side plates 14 are attached to the sides of the rim by screws or bolts 15.

Mounted on the pole pieces are field coils 16 of novel construction. The coils which are previously formed of edgewise wound strap copper or other good conducting material, each have parallel ends 17 and parallel sides 18, the center lines of the ends and sides being all parallel to each other. The coils can thus be easily applied to the pole pieces. Instead of all parts of the individual turns or layers of a coil being normal to the axis of the pole and to the center lines of the sides and ends of the coil as in the usual construction, the sides of the individual layers of the coil or the portions of the individual layers between the pole pieces are inclined to the axis of the pole or coil and to the center lines of the sides 18. This is accomplished preferably by bending the ends 17 of the coils as at 19, adjacent the sides 18, the layers at the ends 17 of the coils being straight and parallel for the greater width of the coil. If desired however, the end portions of the layers may be arc-shaped.

The angle to which the side portions of the layers are inclined will depend somewhat on the design of the machine, especially the diameter of the core or spider and the width of the layers. In all cases the angle will be such that the shearing stress at any portion of a coil will be reduced to a minimum. In an ordinary alternator in which the diameter of the spider is considerable as compared with the length of the poles the shearing stresses between the layers can be made almost negligible by bending the coils to such an extent that the sides of the innermost turns or layers are normal to radii drawn through their centers. In this case the angles between the layers remote from the innermost layer and radii drawn through their centers will be slightly greater than ninety degrees, the angle becoming gradually greater from the innermost to the outermost layer. However in practice, if the innermost layer is normal to a radius drawn through its center, the difference in the angles made by the radii and the different layers will be so slight that all the layers will be substantially normal to radii drawn through their centers. This construction is shown in the drawings. The coils rest on seats 20, the outer faces of which are so shaped as to properly support the coils and the latter are held in place by pole tips 21, which are undercut as shown.

In Fig. 2, the same construction is shown as in Fig. 1, but the parts are shown out of their true proportion to illustrate more clearly my invention. In this figure, O represents the center of rotation, OA the axis of the pole and coil, OB a radius normal to the innermost layer and drawn through its center, and CD the center line of the side of the coil, which line is parallel to the axis of the coil. In actual machines, however, which have a core or spider of very small diameter, if a radius drawn through the center-of-mass of the side of the coil, or in other words through the center of the quadrilateral which represents a section of the side of the coil, cuts the outer portions of the coil section at a point beyond the pole tip, it will be impossible to eliminate entirely the shearing stresses by bending the coils until the innermost layer is normal to a radius drawn through its center. In this case in order that the maximum shear may be made as small as possible, the angle made by the innermost layer and a radius must be slightly less than ninety degrees and this angle, which can be accurately determined, will depend on the design of the machine.

It will be seen that there will be little tendency for any portion of the sides to become displaced for the reason that each layer has a support which receives directly, practically all the stresses of that layer due to centrifugal force. For example the force acting on the innermost layer is transmitted directly to the next adjacent layer, and from layer to layer to the pole tip. In the construction shown, since the angles between the radii and the outermost layers are slightly greater than ninety degrees, there will be a tendency for such layers to move inward toward the pole pieces instead of outward.

I aim in my claims to cover all modifications which do not involve a departure from the spirit and scope of my invention.

What I claim as new and desire to secure by Letters Patent is:—

1. In a rotatable member of a dynamo electric machine, a plurality of projecting pole pieces having field coils, the proportions of each pole surrounded by the coil being of substantially uniform cross section at all points, said coils being formed of edgewise wound strap conducting material and portions of the coils being bent so that portions of the individual layers of each coil between adjacent poles are inclined to the axis of the pole on which the coil is mounted at an angle such that the shearing stresses due to centrifugal force and tending to shift the layers outwardly away from the pole are reduced to a minimum.

2. In a rotatable member of a dynamo electric machine, pole pieces having parallel opposite sides, and coils thereon composed of superposed layers of edgewise wound strap conducting material, the sides of the innermost layers of each coil being substantially normal to radii extending from the axis of the rotatable member to said innermost layers, whereby the shearing stresses due to centrifugal force and tending to shift the layers outward away from the pole are reduced to a minimum.

3. In a dynamo electric machine, a rotatable member having a plurality of projecting poles and a winding consisting of coils of edgewise wound conducting material, portions of layers at the ends of each coil being in parallel planes normal to the axis of the pole and the portions of the layers at the sides of each coil being in parallel planes which are inclined to the axis of the pole at such an angle that the shearing stresses due to centrifugal force and tending to shift the layers outward away from the pole are reduced to a minimum.

4. In a dynamo electric machine, a rotatable field member provided with projecting pole pieces having parallel opposite sides, field coils thereon, each formed of edgewise wound strap conducting material, the portions of the layers at the sides of each coil being inclined to the axis of the pole at an angle such that the shearing stresses between the layers due to centrifugal force and tending to shift the layers outward away from the pole are reduced to a minimum, and pole tips having undercut portions engaging the coils and retaining the latter in place.

In testimony whereof I affix my signature, in the presence of two witnesses.

ALLAN B. FIELD.

Witnesses:
  ARTHUR F. KWIS,
  FRED. J. KINSEY.